United States Patent
Chen et al.

(10) Patent No.: US 8,594,187 B2
(45) Date of Patent: Nov. 26, 2013

(54) EFFICIENT VIDEO BLOCK MODE CHANGES IN SECOND PASS VIDEO CODING

(75) Inventors: Peisong Chen, San Diego, CA (US); Phanikumar Bhamidipati, San Diego, CA (US); Sitaraman Ganapathy Subramania, San Diego, CA (US); Amit Rohatgi, San Diego, CA (US); Seyfullah Halit Oguz, San Diego, CA (US); Scott T. Swazey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1553 days.

(21) Appl. No.: 11/777,395

(22) Filed: Jul. 13, 2007

(65) Prior Publication Data

US 2008/0212677 A1  Sep. 4, 2008

Related U.S. Application Data

(60) Provisional application No. 60/892,804, filed on Mar. 2, 2007.

(51) Int. Cl.
*H04N 11/02* (2006.01)

(52) U.S. Cl.
USPC ............... 375/240.03; 375/240.05; 382/236; 382/237; 382/238

(58) Field of Classification Search
USPC .................... 375/240.05, 240.03; 382/239
See application file for complete search history.

(56) References Cited

U.S. PATENT DOCUMENTS

| | | | | | |
|---|---|---|---|---|---|
| 5,144,424 | A | * | 9/1992 | Savatier ................ | 375/240.03 |
| 6,160,846 | A | * | 12/2000 | Chiang et al. ........... | 375/240.05 |
| 2004/0008899 | A1 | | 1/2004 | Tourapis et al. | |

(Continued)

FOREIGN PATENT DOCUMENTS

| CN | 1471319 A | 1/2004 |
|---|---|---|
| CN | 1487474 A | 4/2004 |

(Continued)

OTHER PUBLICATIONS

Grecos et al: "Fast Inter Mode Prediction for P Slices in the H264 Video Coding Standard", IEEE Transactions on Broadcasting, IEEE Service Center, Piscataway, NJ, US, vol. 51, No. 2, Jun. 1, 2005 pp. 256-263, XP011132561.

(Continued)

*Primary Examiner* — Nathan Flynn
*Assistant Examiner* — Phuoc Tran
(74) *Attorney, Agent, or Firm* — Elaine H. Lo

(57) ABSTRACT

This disclosure describes techniques for second pass video coding in a multi-pass video coding scenario. The coding modes for some video blocks encoded during a second pass may be changed relative to the coding modes used for such video blocks in the first pass. However, motion information does not change for those video blocks that have the changed modes. In particular, mode changes can be made in the second coding pass relative to the modes used in the first coding pass without changing the manner in which motion information will be derived at the decoder, e.g., due to similarities between the original modes of the first pass and changed modes used in the second pass. The second pass coding techniques may also include quantization parameter adjustments, and the mode changes can cause such quantization parameter adjustments to have more profound refinements effects on the second pass coding.

32 Claims, 5 Drawing Sheets

(56) References Cited

U.S. PATENT DOCUMENTS

2004/0114817 A1* 6/2004 Jayant et al. .......... 382/239
2006/0050786 A1   3/2006 Tanizawa et al.
2006/0193385 A1   8/2006 Yin et al.

FOREIGN PATENT DOCUMENTS

| CN | 1810037 A | 7/2006 |
|---|---|---|
| EP | 1379090 | 1/2004 |
| EP | 1549074 | 6/2005 |
| JP | 5244586 | 9/1993 |
| JP | 2004254274 A | 9/2004 |
| JP | 2006080925 A | 3/2006 |

OTHER PUBLICATIONS

International Search Report—PCT/US08/055553, International Search Authority—European Patent Office—Aug. 4, 2008.
Written Opinion—PCT/US2008/055553, International Search Authority—European Patent Office—Aug. 4, 2008.
Taiwan Search Report—TW097107409—TIPO—Jan. 25, 2012.

* cited by examiner

EFFICIENT VIDEO BLOCK MODE CHANGES IN SECOND PASS VIDEO CODING

RELATED APPLICATION

This application claims the benefit of U.S. Provisional Application No. 60/892,804, filed Mar. 2, 2007, the entire content of which is incorporated herein by reference.

TECHNICAL FIELD

This disclosure relates to digital video coding and, more particularly multi-pass video coding in which a first pass is used to code video blocks and a second pass refines the coding in order to meet bit-rate constraints or attain other goals.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

In video coding, video compression often includes spatial prediction, motion estimation and motion compensation. Intra-coding relies on spatial prediction to reduce or remove spatial redundancy between video blocks within a given video frame. Inter-coding relies on temporal prediction to reduce or remove temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vectors to generate prediction video blocks from a reference frame or slice. After motion compensation, residual information (such as a residual video block) is generated by subtracting the prediction video block from the original video block to be coded. The video encoder usually applies transform, quantization and transform coefficient coding processes to further reduce the bit rate associated with communication of the residual block.

Sometimes, video coding uses multiple passes. In multi-pass video coding, a first video coding pass is used to code video blocks, and a second video coding pass changes and refines the coding. Multi-pass video coding may be used to adjust the bit-rate associated with the video coding. Conventionally, second pass video coding may re-perform all of the coding steps of the first video coding pass, but may apply a different level of quantization. A full re-encode of all of the video blocks during the second coding pass, however, is computationally intensive.

SUMMARY

In general, this disclosure describes techniques for second pass video coding in a multi-pass video coding scenario. The second coding pass refines the coding performed in the first pass, e.g., in order to meet bit-rate constraints, exploit unused bandwidth, and/or attain other goals. In accordance with this disclosure, the coding modes for some video blocks encoded during a second pass may be changed relative to the coding modes used for such video blocks in the first pass. However, motion information does not change for those video blocks that have the changed modes. As an example, bi-directional predictive (B) slices (or frames) may support video block coding in so-called "skipped" modes and so-called "direct" modes. In both skipped and direct modes, the motion information is derived the same way at the decoder, e.g., based on the motion information of neighboring video blocks. The difference between skipped and direct modes, however, is that direct mode video blocks include residual information, while skipped mode video blocks do not include residual information.

According to this disclosure, second pass coding may change video block modes for some blocks, e.g., between skipped or direct modes, without changing the manner in which the motion information is defined for such blocks. For example, video blocks may be changed from direct mode to skipped mode or from skipped mode to direct mode without changing the manner in which motion information will be derived at the decoder. Residual information may be added for any video blocks changed from skipped mode to direct mode, and residual information may be eliminated for any video blocks changed from direct mode to skipped mode. For predictive (P) slices or frames, second pass mode changes from a skipped mode to an inter 16 by 16 mode may also benefit from aspects of this disclosure. The second pass coding techniques may also include quantization parameter adjustments, and the mode changes can cause such quantization parameter adjustments to have more profound effects on the coding refinements of the second coding pass than would be achieved without the mode changes.

In one example, this disclosure provides a method of video coding comprising encoding video blocks in a first encoding pass, wherein the first encoding pass selects video coding modes for the video blocks that define motion information for the video blocks, and encoding the video blocks in a second encoding pass, wherein the second encoding pass adjusts one or more quantization parameters associated with the video blocks, and changes at least some of the video coding modes associated with the video blocks based on the adjusted quantization parameters, wherein the changed video coding modes do not change the motion information.

In another example, this disclosure provides an apparatus comprising a video encoder that encodes video blocks in a first encoding pass, wherein the first encoding pass selects video coding modes for the video blocks that define motion information for the video blocks, and encodes the video blocks in a second encoding pass, wherein the second encoding pass adjusts one or more quantization parameters associated with the video blocks, and changes at least some of the video coding modes associated with the video blocks based on the adjusted quantization parameters, wherein the changed video coding modes do not change the motion information.

In another example, this disclosure provides a device comprising means for encoding video blocks in a first encoding pass, wherein means for encoding video blocks in the first encoding pass includes means for selecting video coding modes for the video blocks that define motion information for the video blocks; and means for encoding the video blocks in a second encoding pass, wherein means for encoding the video blocks in the second encoding pass includes means for adjusting one or more quantization parameters associated with the video blocks, and means for changing at least some of the video coding modes associated with the video blocks based on the adjusted quantization parameters, wherein the changed video coding modes do not change the motion information.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that, when executed in a processor cause the processor to encode video blocks in a first encoding pass, wherein the first encoding pass selects video coding modes for the video blocks that define motion information for the video blocks, and encode the video blocks in a second encoding pass, wherein the second encoding pass adjusts one or more quantization parameters associated with the video blocks, and changes at least some of the video coding modes associated with the video blocks based on the adjusted quantization parameters, wherein the changed video coding modes do not change the motion information.

In some cases, the computer-readable medium may form part of a computer program product, which may be sold to manufacturers and/or used in a video coding device. The computer program product may include the computer-readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
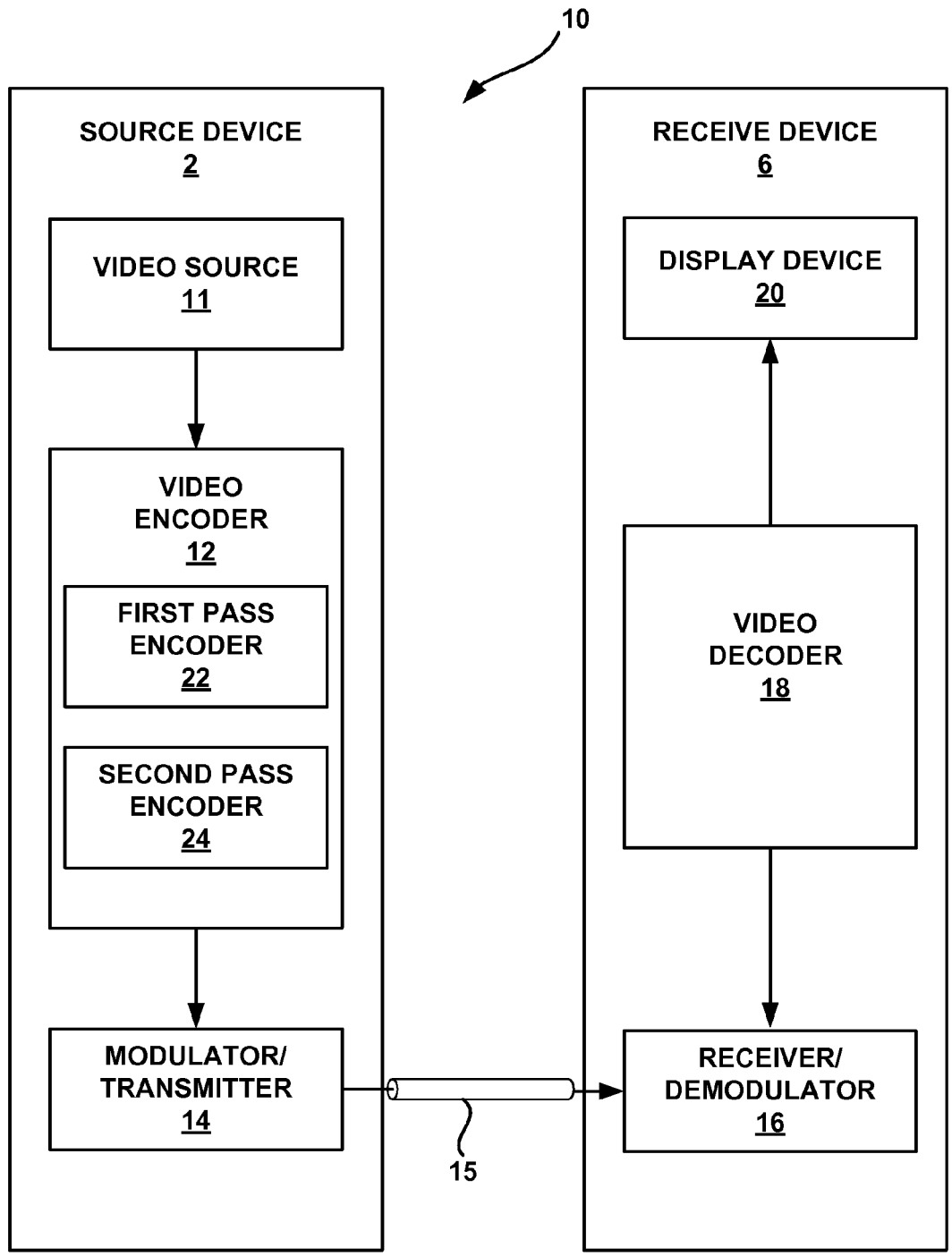
FIG. 1 is an exemplary block diagram illustrating a video encoding and decoding system according to this disclosure.

This disclosure describes techniques for second pass video coding in a multi-pass video coding scenario. The second video coding pass refines the video coding performed in the first pass to in order to meet bit-rate constraints, exploit unused bandwidth, or attain other goals. In this disclosure, the second coding pass generally refers to any subsequent coding pass following a first coding pass. Thus, the term "second" in the phrase "second coding pass" does not imply any ordered relationship to other coding passes, except that the second pass is performed subsequent to a first coding pass. The second coding pass, as described herein, could actually be any subsequent coding pass, such as a third or fourth coding pass following a first coding pass.

In accordance with this disclosure, the coding modes used for some video blocks in the second coding pass may be changed relative to the coding modes used in the first pass. However, motion information remains the same (i.e., the motion information is derived at the decoder in the same way) for the video blocks that have the mode changes. In some cases, the second coding pass may reuse any motion-based computations performed during the first coding pass since the motion information will not change for those video blocks that have mode changes.

In multi-pass video coding, a first pass is used to code video blocks and a second pass refines the coding performed during the first pass. In some cases, second pass coding may fully re-encode the information. However, for efficiency and simplicity it may be more desirable for second pass coding to adopt some of the information created in the first pass, and refine other portions of the coded information generated during the first pass. For example, the motion vector information defined for video blocks in the first pass may be assigned to the same video blocks in the second pass without re-calculating the motion vectors in order to ensure that propagation effects are not introduced. However, quantization parameters used for the second pass may change relative to the quantization parameters used for the first pass.

According to this disclosure, second pass coding may change video block modes, e.g., between skipped or direct modes. Direct modes and skipped modes are two examples of video coding modes that define motion information for the video blocks. In particular, direct mode video blocks and skipped mode video blocks are not encoded to include motion information, but rather, for these modes, the motion information is derived at the decoder based on the motion information of neighboring video blocks. As an example, this disclosure proposes the ability to change between skipped and direct modes in second pass encoding. A switch from skipped to direct mode, for example, may help to ensure that quantization parameter changes will have a profound quality enhancement effect on the second pass encoding. Alternatively, a switch from direct to skipped mode may provide an easy way to reduce the bit-rate without performing a full re-encode in the second pass.

Residual information may be added for any video blocks changed from a skipped mode to a direct mode, and residual information may be eliminated for any video blocks changed from a direct mode to a skipped mode. In conjunction with these mode changes, a quantization parameter change can achieve more significant coding enhancements or adjustments in the second coding pass than could be achieved without the mode changes. The specific mode changes contemplated by this disclosure do not introduce any propagation effects, such as changes in video frames that propagate due to changes in motion vectors, because direct and skipped modes assign motion vectors in a similar way, i.e., based on the motion vectors of neighboring video blocks. Computational complexity may also be reduced in the second coding pass, relative to conventional techniques, such as techniques that perform full re-encodes during the second coding pass.

Different types of video coding units (such as frames of video blocks or slices of video blocks) may have different coding modes that can be used to code the video blocks of that type of video coding unit. For example, in ITU H.264, there are intra (I) frames or slices, predictive (P) frames or slices and bi-directional predictive (B) frames or slices. Although the video coding units may be defined on frame or slice levels, the following disclosure will refer simply to I slices, P slices and B slices, for simplicity. The techniques of this disclosure, however, can also apply if video coding units are defined on the frame level or in a different manner.

I slices have video blocks that are coded via spatial prediction and intra-coding. In this case, the video blocks are compared to other video blocks of the same slice in order to exploit spatial redundancy. For video blocks of I slices, a predictive block within the same slice is used to define residual information, which is indicative of the differences between the video block being coded and the predictive block within the same slice. I slices typically exhibit the least amount of compression (e.g., among I, P and B slices), but are more inherently robust than other slices, since they do not rely on information in other slices for prediction.

P slices have video blocks that are coded via motion estimation and motion compensation relative to video blocks of previously coded slices in order to exploit temporal redundancy. For video blocks of P slices, a predictive block in a previously coded slice may be used to define the residual information. Again, the residual information refers to information indicative of the differences between the video block being coded and the predictive block, which, for P slices, resides within a previously coded slice to exploit temporal redundancy.

B slices have video blocks that are coded via motion estimation and motion compensation relative to video blocks that reside in previously coded and/or subsequently coded slices. For video blocks of B slices, a predictive block in a different slice (in either a positive or negative temporal direction of a video sequence) may be used to define the residual information.

I slices may serve as references for the inter-prediction of video blocks of other P or B slices. Thus, the video blocks of P of B slices may define motion information that refers back to video blocks of I slices. Similarly, P slices may serve as references for the inter-prediction of other P slices or B slices. B slices, however, are typically not used as references, although some refinements to ITU H.264 allow some B slices to serve as references.

Each type of slice (e.g., I slices, P slices or B slices) may define several possible modes that can be used to code the different video blocks. For example, the video blocks of I slices may define intra-modes, such as intra 16 by 16, intra 16 by 8, intra 8 by 16, intra 8 by 8, intra 8 by 4, intra 4 by 8, intra 4 by 4, and so forth. The video blocks of P slices may use the intra modes, and may also define various inter modes such as inter 16 by 16, inter 16 by 8, inter 8 by 16, inter 8 by 8, inter 8 by 4, inter 4 by 8, inter 4 by 4, and so forth. In addition, P slices may define a so-called "skipped mode." Video blocks coded in the skipped mode define motion vectors based on the motion vectors of neighboring video blocks and do not include any residual information. At the decoder, the motion vectors for skipped mode video blocks are derived based on the motion vectors of neighboring video blocks. Accordingly, motion vector information does not need to be encoded or conveyed for skipped mode video blocks.

The video blocks of B slices may support the various modes of I and P slices, and motion vectors may point to previous or subsequent slices of a video sequence. Like the video blocks of P slices, the video blocks of B slices may define skipped modes. In addition, B slices also support another mode, referred to as a "direct mode." The direct mode is similar to the skipped mode in some respects, but video blocks coded in the direct mode include residual information. In particular, video blocks coded in the direct mode may lack any motion vectors, as direct mode video blocks define motion vectors based on the motion vectors of neighboring video blocks. However, direct mode video blocks include residual information indicative of the difference between the video blocks identified by the motion vectors and the video blocks being coded.

In accordance with this disclosure, second pass coding may change modes of video blocks of B slices between skipped or direct modes without changing the motion information (e.g., motion vectors) defined for the video blocks. Residual information may be added for any video blocks changed from skipped mode to direct mode, and residual information may be eliminated for any video blocks changed from direct mode to skipped mode. Similar techniques may also be applied for video blocks of P slices to change from a skipped mode to an inter 16 by 16 mode. Since P slices may not support the direct mode, the use of an inter 16 by 16 mode may be used in place of the direct mode, with an assigned motion vector that is derived based on a motion vector calculation for a skipped mode video block. In this case, the motion vector defined for the video block of a P slice in the skipped mode (as selected during the first coding pass) is assigned to the video block in inter 16 by 16 mode in the second pass. Residual information is then generated as a difference between the predictive video block and the block being coded. In this case, although the video block may be defined as an inter 16 by 16 mode block, its motion vector is actually calculated as the motion vector that would have been defined by the skipped mode of the first coding pass. The encoder simply assigns motion vector that would have been defined by the skipped mode of the first coding pass as the motion vector of the second pass in inter 16 by 16 mode. The inter 16 by 16 mode allows the residual information to be included for video blocks of P slices.

The quantization parameters used in the coding may be adjusted in the second coding pass relative to the first coding pass. Conventionally, however, a reduction in a quantization parameter (which should yield better quality) may not have a very significant effect, particularly on B slices, because the video blocks in skipped mode lack residual information. By changing the skipped mode to direct mode in B slices, a reduction in the quantization parameter can achieve a much more significant effect on the video blocks relative to conventional coding techniques. This is because the quantization parameter change manifests changes in the residual information. Since residual information is included in direct mode video blocks but not included in the skipped mode, the mode change is needed to better exploit the effect of a quantization parameter change on such residual information. At the same time, these specific mode changes will not introduce any undesirable propagation effects or mismatch from changes in motion information, since direct mode video blocks and skipped mode video blocks define motion vectors in the same way.

FIG. 1 is a block diagram illustrating a video encoding and decoding system 10. As shown in FIG. 1, system 10 includes a source device 2 that transmits encoded video to a receive device 6 via a communication channel 15. Source device 2 may include a video source 11, video encoder 12 and a modulator/transmitter 14. Receive device 6 may include a receiver/demodulator 16, video decoder 18, and display device 20. System 10 may be configured to apply two-pass coding techniques, as described herein, in which quantization parameter changes and mode changes are performed with respect to video blocks, but any motion vector information is not changed in the second pass.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 2 to receive device 6.

Source device 2 generates coded video data for transmission to receive device 6. In some cases, however, devices 2, 6 may operate in a substantially symmetrical manner. For example, each of devices 2, 6 may include video encoding and decoding components. Hence, system 10 may support one-way or two-way video transmission between video devices 2, 6, e.g., for video streaming, video broadcasting, or video telephony.

Video source 11 of source device 2 may include a video capture device, such as a video camera, a video archive containing previously captured video, or a video feed from a video content provider. As a further alternative, video source 11 may generate computer graphics-based data as the source video, or a combination of live video and computer-generated video. In some cases, if video source 11 is a video camera, source device 2 and receive device 6 may form so-called camera phones or video phones. In each case, the captured, pre-captured or computer-generated video may be encoded by video encoder 12 for transmission from video source device 2 to video decoder 18 of video receive device 6 via modulator/transmitter 14, communication channel 15 and receiver/demodulator 16. Video encoder 12 includes a first pass encoder 22 and a second pass encoder 24 to support the multi-pass coding techniques of this disclosure. Upon receiving and decoding the video data, receive device 6 uses display device 20 to display the decoded video data to a user. Display device 20 and may comprise any of a variety of display devices such as a cathode ray tube, a liquid crystal display (LCD), a plasma display, an organic light emitting diode (OLED) display, or another type of display device.

In some cases video encoder 12 and video decoder 18 may be configured to support scalable video coding (SVC) for spatial, temporal and/or signal-to-noise ratio (SNR) scalability, although the techniques of this disclosure are not limited to SVC. In some aspects, video encoder 12 and video decoder 18 may be configured to support fine granularity SNR scalability (FGS) coding for SVC. Encoder 12 and decoder 18 may support various degrees of scalability by supporting encoding, transmission and decoding of a base layer and one or more scalable enhancement layers. For SVC, a base layer carries video data with a baseline level of quality. One or more enhancement layers carry additional data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers. The different layers of a SVC scheme, however, may be defined in many other ways.

Video encoder 12 and video decoder 18 may operate according to a video compression standard, such as MPEG-2, MPEG-4, ITU-T H.263, or ITU-T H.264/MPEG-4, Part 10, Advanced Video Coding (AVC). Although not shown in FIG. 2, in some aspects, video encoder 12 and video decoder 18 may each be integrated with an audio encoder and decoder respectively, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The techniques may also apply to other standards or video coding protocols.

If used for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, source device 2 may be a mobile wireless terminal, a video streaming server, or a video broadcast server. However, techniques described in this disclosure are not limited to any particular type of broadcast, multicast, or point-to-point system. In the case of broadcast, source device 2 may broadcast several channels of video data to multiple receive devices, each of which may be similar to receive device 6 of FIG. 1.

In other examples, modulator/transmitter 14 communication channel 15, and receiver demodulator 16 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1xEV-DO (First generation Evolution Data Only) or 1xEV-DO Gold Multicast system, an IEEE 802.11 system, a MediaFLO™ system, a DMB system, a DVB-H system, or another scheme for data communication between two or more devices.

Video encoder 12 and video decoder 18 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 12 and video decoder 18 may be included in one or more encoders or decoders, either of which may be integrated as part of a combined encoder/decoder (CODEC) in a respective mobile device, subscriber device, broadcast device, server, or the like. In addition, source device 2 and receive device 6 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 14 of source device 2 and receiver/demodulator 16 of receive device 6 in FIG. 2. Modulator/transmitter 14 and receiver/demodulator 16 may each comprise separate or integrated components.

A video sequence includes a series of video frames. Video encoder 12 operates on blocks of pixels within individual video frames in order to encode the video data. The video blocks may have fixed or varying sizes, and may differ in size according to a specified coding standard. In some cases, each video frame is a coded unit, while, in other cases, each video frame may be divided into a series of slices that form coded units. Each slice may include a series of macroblocks, which may be arranged into sub-blocks. As an example, the ITU-T H.264 standard supports intra prediction in various block sizes, such as 16 by 16 or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can provide better resolution, and may be used for locations within a video frame that include higher levels of detail. In general, macroblocks (MBs) and the various sub-blocks may be considered to be video blocks. In addition, a slice may be considered to be a series of video blocks, such as MBs and/or sub-blocks. As noted, each slice may be an independently decodable unit of a video frame.

Following intra- or inter-based predictive coding, additional coding techniques may be applied to the transmitted bitstream. These additional coding techniques may include transformation techniques (such as the 4×4 or 8×8 integer transform used in H.264/AVC or a discrete cosine transformation DCT), and transform coefficient coding (such as variable length coding of the transform coefficients). Blocks of transformation coefficients may be referred to as video blocks. In other words, the term "video block" refers to a block of video data regardless of the domain of the information. Thus, video blocks can be in a pixel domain or a transformed coefficient domain.

Video encoder 12 includes a first pass encoder 22 and a second pass encoder 24, which may be separate components or processes, or may be integrated into a common component or process. First pass encoder 22 performs a first encoding pass to code the video blocks of various frames or slices of a video sequence. Second pass encoder 22 then refines the coding performed during the first pass. In particular, for efficiency and simplicity, second pass encoder 24 adopts some of the information created in the first pass, and refines other portions of the coded information generated during the first pass. For example, the motion information (e.g., motion vectors) defined for any inter coded video blocks in the first pass may be assigned to the same video blocks in the second pass without re-calculating the motion information in order to ensure that propagation errors are not introduced. However, quantization parameters used for the second pass may change relative to the quantization parameters used for the first pass.

According to this disclosure, second pass encoder 24 may change video block modes, e.g., between skipped or direct modes, without causing any change in the motion information or the manner in which such motion information will be derived at decoder 18 or receive device 6. Residual information may be added for any video blocks changed from a skipped mode to a direct mode, and residual information may be eliminated for any video blocks changed from a direct mode to a skipped mode. In conjunction with these mode changes, a quantization parameter change can achieve more significant coding enhancements or adjustments in the second coding pass than could be achieved without the mode changes. The specific mode changes contemplated by this disclosure do not introduce any propagation effects because direct and skipped modes assign motion vectors in a similar way, i.e., based on the motion vectors of neighboring video blocks.

Figure 2:
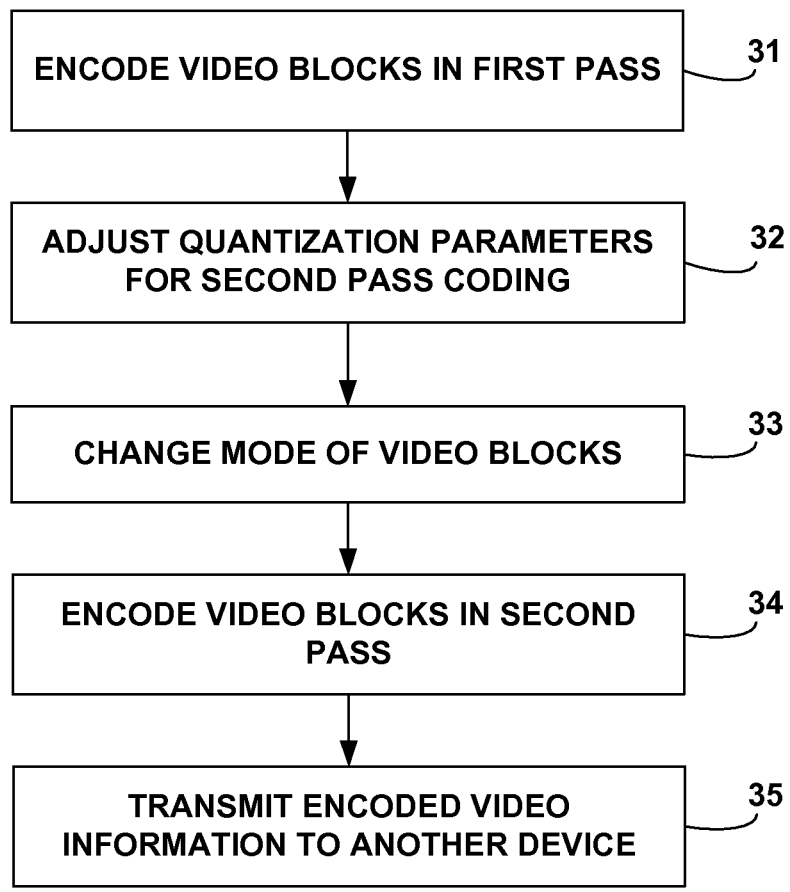
FIG. 2 is a flow diagram illustrating a multi-pass coding technique according to this disclosure.

FIG. 2 is a flow diagram illustrating a video coding technique according to this disclosure. As shown in FIG. 2, first pass encoder 22 encodes video blocks in a first coding pass (31). During the first coding pass, first pass encoder 22 may define quantization parameters for the different video blocks, and may select coding modes based on the quantization parameters. The quantization parameters may define the level of quantization used in the coding. For example, lower quantization parameters result in higher quality and less compression than higher quantization parameters. The coding modes used in the first pass may depend on the selected quantization parameters. For example, a Lagrange multiplier ($\lambda$) may be defined as $\lambda=2^{-(QP)}$ or as $\lambda=e^{-(QP)}$ where "e" represents the base of the natural logarithmic function (e.g., e=2.718281828459) and QP represents the selected quantization parameter. Thus, an adjustment to QPs can be used to scale the Lagrange multipliers. Different values of the Lagrange multiplier ($\lambda$) may cause different mode selection. In this manner, the coding modes can be selected based on quantization parameters.

Upon selecting the proper coding modes, first pass encoder 22 encodes the video blocks according to the selected coding modes. For example, if an intra coding mode is selected for a video block, first pass encoder 22 performs spatial estimation and intra coding to code the video block. If an inter coding mode is selected for a video block, first pass encoder 22 performs motion estimation prediction and motion compensation to code the video block. If a direct coding mode is selected for a video block, first pass encoder 22 determines the motion vector for that video block based on the motion vectors of neighboring video blocks, and generates residual information to code the video block. In this case, for video blocks coded using the direct mode, the motion vector information does not need to be coded, since it can be derived at the decoder based on the motion vectors of neighboring video blocks. If a skipped coding mode is selected for a video block, first pass encoder 22 does not code any motion or residual information. For video blocks coded using the skipped mode, like those coded using the direct mode, the motion vector information can be derived at the decoder based on the motion vectors of neighboring video blocks. Thus, the only difference between video blocks coded via direct mode and those coded via skipped mode is that the video blocks coded via direct mode include residual information, whereas the video blocks coded via skipped mode lack any residual information.

Once the video blocks are coded in the first pass (31), second pass encoder 24 adjusts quantization parameters for a second coding pass (32). In this case, if the amount of data generated in the first coding pass is excessive relative to the available bandwidth, then the quantization parameters may be increased to cause more quantization and less data in the second pass. Alternatively, if the amount of data generated in the first coding pass is low relative to the available bandwidth, then the quantization parameters may be decreased to cause less quantization and more data in the second pass.

In addition, second pass encoder 24 changes the coding mode for one or more video blocks (33). For example, as described in greater detail below, skipped video blocks may be changed to direct video blocks (for B slices) or to inter 16 by 16 video blocks (for P slices) so that residual information can be included for such video blocks without changing the motion vectors. In this case, the mode changes in conjunction with quantization parameter changes can have a more useful quality enhancement on the second pass coding than would be achieved with quantization parameter changes alone. At the same time, the mode changes will not introduce any mismatch or propagation effects since the changed modes use the same manner for motion vector calculation. Propagation effects, for example, can manifest when the motion vector of one video block is changed, and that video block is also used as a reference block for the coding of a different video block. In this case, the change in the motion vector of the first block may impact the second video block. The second video block maybe have been coded with an assumption that the motion vector of the first (reference) video block was X. If the motion vector is changed to Y, this can have effects not only on the first video block, but also on the second video block insofar as the second video block relies on the first video block as its predictive reference. Such effects may be referred to herein as propagation effects, propagation errors or mismatch.

If more data compression is needed, direct mode video blocks (for B slices) may be changed to skipped mode video blocks. This eliminates the residual information for such video blocks, and therefore reduces the amount of data needed for the video coding. This also reduces quality, however, which may be necessary to achieve a desired bit rate. The desired bit rate may be set by a service provider, set by a quality of service level, set by physical bandwidth constraints, or generally set in any manner. In any case, second pass encoder 24 may simply change information that specifies the mode of the video blocks, from direct to skipped, and eliminate the residual information generated during the first coding pass to code the direct video blocks.

If quality enhancement is needed, and there exists excess bandwidth, skipped mode video blocks (for B slices) may be changed to direct mode video blocks. In this case, residual information is generated and included for such video blocks, which increases the amount of data needed for the video coding and allows more profound quality enhancements based on a quantization parameter decrease than could be achieved with a quantization parameter adjustment alone. In this case, second pass encoder 24 may simply change information that specifies the mode of the video blocks, from direct to skipped, and generate the residual information needed to code the direct video blocks.

Using the adjusted quantization parameters and changed modes, second pass encoder 24 encodes the video blocks in the second pass (34). Again, this refines the video coding performed in the first pass to in order to meet bit-rate constraints, exploit unused bandwidth, or attain other goals. Second pass encoder 24 may perform quantization parameter adjustment (32), mode changes (33) and second pass coding (34) together in order to collectively balance the affects of quantization parameter adjustment and mode changes in a manner that can achieve the desired bit-rate increase or reduction. Modulator/transmitter 14 can modulate the encoded information according to a physical layer modulation scheme and transmit the encoded information to receive device 6 via communication channel 15 (35).

Figure 3:
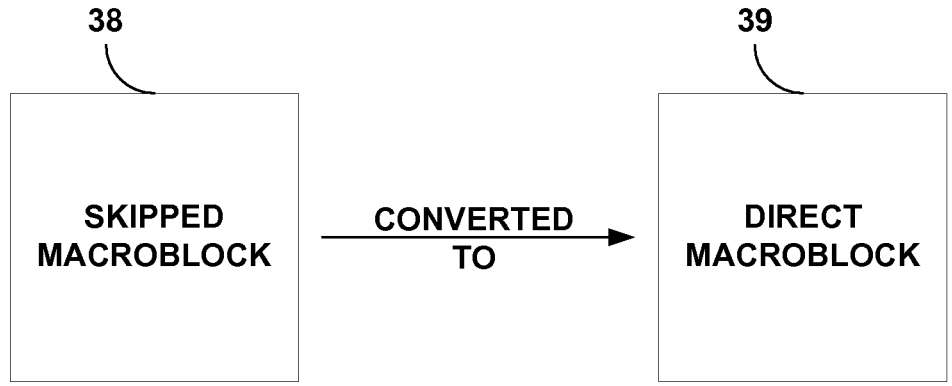
FIG. 3 is a conceptual illustration of a video block of a bi-directional predictive (B) slice being changed from a skipped mode to a direct mode.
Figure 4:
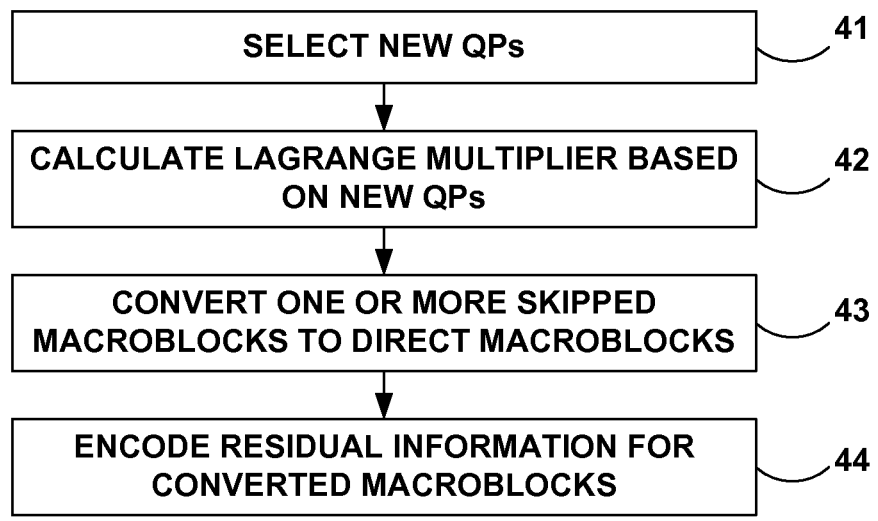
FIG. 4 is a flow diagram illustrating a second pass coding technique in which a video block of a B slice is changed from a skipped mode to a direct mode.

FIG. 3 is a conceptual illustration of a video block of a B slice being changed from a skipped mode macroblock 38 to a direct mode macroblock 39. FIG. 4 is a flow diagram illustrating a second pass coding technique in which video blocks of a B slice are changed from a skipped mode to a direct mode. In order to convert a given video block from a skipped mode macroblock 38 into a direct mode macroblock 39, second pass encoder 24 generates residual information for the given video block in the direct mode. Since skipped macroblocks and direct macroblocks derive motion information at the decoder in the same way (based on the motion information of neighboring macroblocks), the change from skipped to direct mode need not include any motion estimation. Information designating the encoding mode is simply changed to reflect the mode change, and residual information associated with the direct mode macroblock is generated.

More specifically, as shown in FIG. 4, second pass encoder 24 selects new quantization parameters (QPs) for the video blocks being coded (41). In this case, the new QPs may be lower than those used in coding the video blocks during the first coding pass, which may result in less quantization and better resolution. Using the new QPs, second pass encoder 24 calculates new Lagrange multipliers (42). The Lagrange multipliers, for example, may be calculated as $\lambda = 2^{-(QP)}$ or as $\lambda = e^{-(QP)}$ where "e" represents the base of the natural logarithmic function (e.g., e=2.718281828459) and QP represents the selected quantization parameter. Thus, an adjustment to QPs can be used to scale the Lagrange multipliers according to the equations above. Different values of the Lagrange multiplier ($\lambda$) may cause different mode selection.

Based on the scaled Lagrange multipliers, second pass encoder 24 converts one or more skipped macroblocks to direct macroblocks (43). In particular, cost function may be calculated based on Lagrange multiplier values and skipped macroblocks may be replaced with direct macroblocks if the latter provide advantages in terms of coding rate and/or distortion. For example, skipped mode to direct mode conversion may be based on rate-distortion (R-D) cost weighted by the Lagrange multipliers. Alternative, another simple way to provide skipped mode to direct mode conversion is to quantize the residual of each skipped macroblock, and if there are nonzero coefficients after quantization, declare it direct macroblock. Following the conversion of one or more skipped macroblocks to direct macroblocks, second pass encoder 24 then encodes residual information for the converted macroblocks (44). In particular, second pass encoder 24 may calculate the motion vectors based on motion vectors of neighboring video blocks, generate the predictive blocks identified by the motion vectors, and code residual information indicative of the differences between the predictive blocks and the blocks being coded as direct macroblocks. The motion vector information, however, may be excluded from the encoded bitstream, as this can be generated at the decoder.

Figure 5:
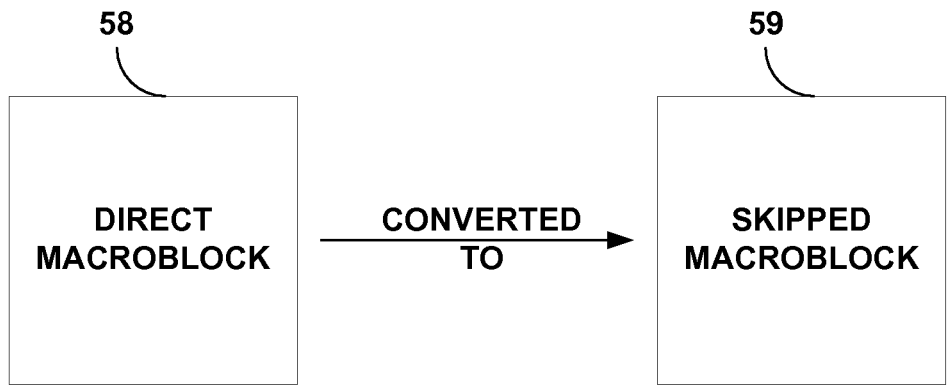
FIG. 5 is a conceptual illustration of a video block of a B slice being changed from a direct mode to a skipped mode.
Figure 6:
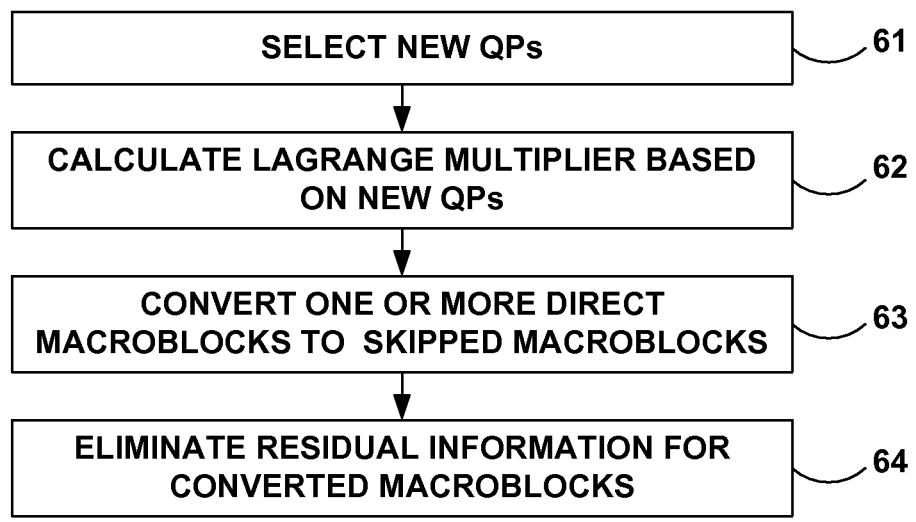
FIG. 6 is a flow diagram illustrating a second pass coding technique in which a video block of a B slice is changed from a direct mode to a skipped mode.

FIG. 5 is a conceptual illustration of a video block of a B slice being changed from a direct mode macroblock 58 to a skipped mode macroblock 59. FIG. 6 is a flow diagram illustrating a second pass coding technique in which video blocks of a B slice are changed from a direct mode to a skipped mode. In order to convert a given video block from a direct mode macroblock 58 into a skipped mode macroblock 59, second pass encoder 24 basically changes the mode and eliminates residual information for the given video block in the skipped mode.

Again, since skipped macroblocks and direct macroblocks derive motion information at the decoder in the same way (based on the motion information of neighboring macroblocks), the change from direct mode to skipped mode need not include any motion estimation. Information designating the encoding mode is simply changed to reflect the mode change, and residual information associated with the direct mode macroblock is discarded.

As shown in FIG. 6, second pass encoder 24 selects new quantization parameters (QPs) for the video blocks being coded (61). In this case, the new QPs may be higher than those used in coding the video blocks during the first coding pass, which may result in more quantization and less quality. Using the new QPs, second pass encoder 24 calculates new Lagrange multipliers (62), e.g., by scaling the Lagrange multipliers using one of the equations described above. Different values of the Lagrange multiplier ($\lambda$) may cause different mode selection.

Based on the scaled Lagrange multipliers, second pass encoder 24 converts one or more direct macroblocks to skipped macroblocks (63). A cost function may be calculated based on Lagrange multiplier values and direct macroblocks should be replaced with skipped macroblocks if the latter provide lower cost. Alternatively, direct macroblocks that lack any residual information (or lack a threshold level of residual information) may simply be declared as skipped macroblocks. Second pass encoder 24 then eliminates residual information for the converted macroblocks (64).

Figure 7:
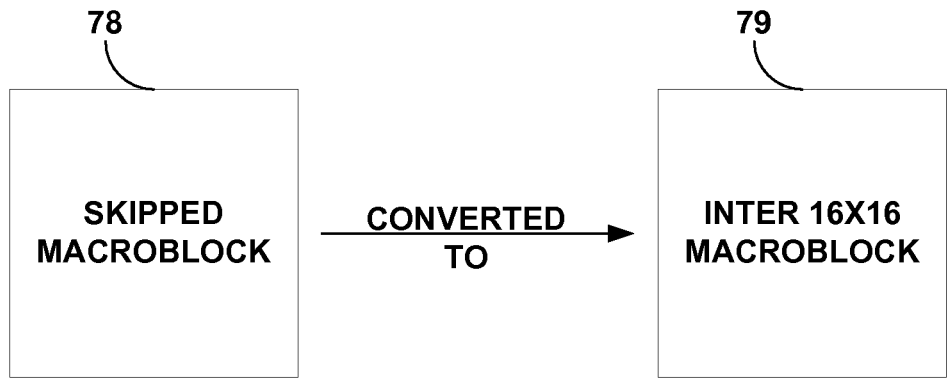
FIG. 7 is a conceptual illustration of a video block of a predictive (P) slice being changed from a skipped mode to an inter 16 by 16 mode.
Figure 8:
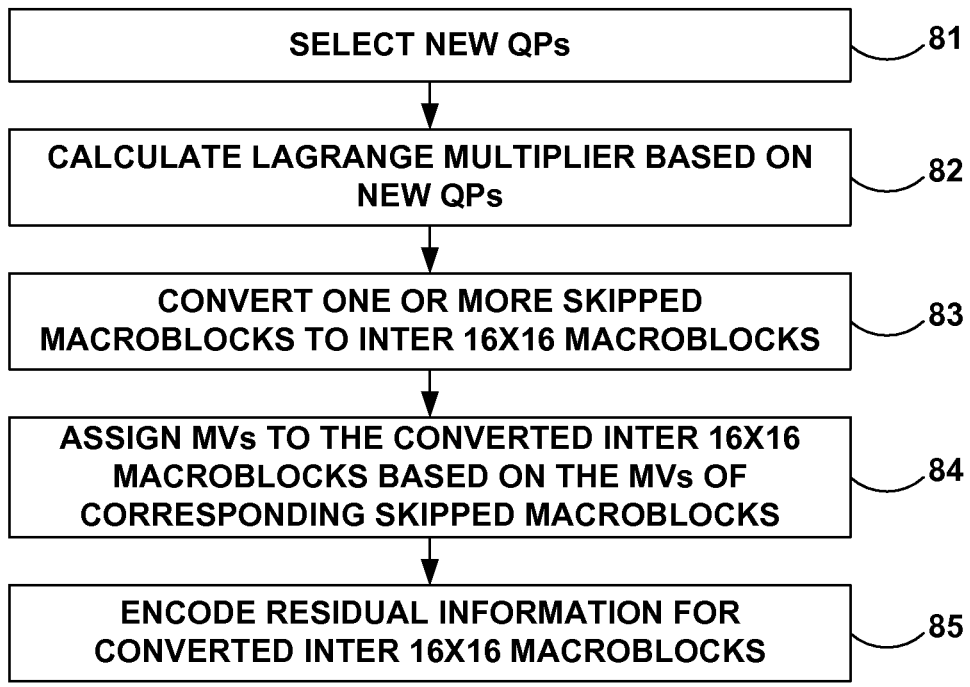
FIG. 8 is a flow diagram illustrating a second pass coding technique in which a video block of a P slice is changed from a skipped mode to an inter 16 by 16 mode.

FIG. 7 is a conceptual illustration of a video block of a P slice being changed from a skipped mode macroblock 78 to an inter 16 by 16 macroblock 79. FIG. 8 is a flow diagram illustrating a second pass coding technique in which video blocks of a P slice are changed from a skipped mode to an inter 16 by 16 mode. Unlike B slices, P slices may not support the direct mode. In this case, however, a mode change from skipped mode to inter 16 by 16 mode for P slices can be modified to give an effect that is similar to a mode change from skipped mode to direct mode in B slices.

In order to convert a given video block from a skipped mode macroblock 78 into a an inter 16 by 16 macroblock 79, second pass encoder 24 changes the given video block from a skipped mode video block to an inter mode video block, assigns a motion vector to the inter mode video block based on a motion vector calculation for the skipped mode video block, and generates residual information for the given video block in the inter mode.

More specifically, as shown in FIG. 8, second pass encoder 24 selects new quantization parameters (QPs) for the video blocks being coded (81). In this case, the new QPs may be lower than those used in coding the video blocks during the first coding pass, which may result in less quantization and better quality. Using the new QPs, second pass encoder 24 calculates new Lagrange multipliers (82). Again, the Lagrange multipliers may be calculated, for example, as $\lambda=2^{-(QP)}$ or as $\lambda=e^{-(QP)}$ where "e" represents the base of the natural logarithmic function (e.g., e=2.718281828459) and QP represents the selected quantization parameter. A cost function may be calculated based on Lagrange multiplier values to facilitate selection of the mode with the minimal cost. The new QPs scale the Lagrange multipliers according to the equations above, and the scaled Lagrange multipliers are used to select coding modes that may or may not be different from those of the first coding pass.

Based on the scaled Lagrange multipliers, second pass encoder 24 converts one or more skipped macroblocks to inter 16 by 16 macroblocks (83). A cost function may be calculated based on Lagrange multiplier values and skipped macroblocks should be replaced with inter 16 by 16 macroblocks if the latter provide lower cost. For example, skipped mode to inter 16 by 16 mode conversion may be based on rate-distortion (R-D) cost weighted by the Lagrange multipliers. Alternatively, another simple way to provide skipped mode to inter 16 by 16 mode conversion is to quantize the residual of each skipped macroblock, and if there are nonzero coefficients after quantization, declare it an inter 16 by 16 macroblock. Second pass encoder 24 assigns motion information (e.g., motion vectors) to the converted inter 16 by 16 macroblocks based on the motion vectors of corresponding skipped macroblocks. In other words, although second pass encoder 24 denotes the macroblocks as having been coded in the inter 16 by 16 mode, the motion vectors are actually the same as the original motion vectors defined by the skipped mode. Using the motion vectors to identify the predictive blocks, second pass encoder 24 then generates and encodes residual information for the converted inter 16 by 16 macroblocks.

Even though second pass encoder 24 calculates the motion vectors for the inter 16 by 16 mode macroblocks using calculations conventionally used only for skipped macroblocks, the technique of FIG. 8 remains standard compliant (e.g., with ITU H.264), since the encoding scheme that is used is not known to the decoder. Thus, the decoder will simply decode the inter 16 by 16 mode macroblock, and will not question how the motion vectors were calculated by the encoder.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

The invention claimed is:

1. A method of video coding comprising:
    encoding video blocks in a first encoding pass, wherein the first encoding pass selects one of a plurality of video coding modes for the video blocks that define motion information for the video blocks; and
    encoding the video blocks in a second encoding pass, wherein the second encoding pass adjusts one or more quantization parameters associated with the video blocks, and changes at least some of the video coding modes associated with the video blocks based on the adjusted quantization parameters, wherein the changed video coding modes affect residual information for the video blocks but do not change the motion information.

2. The method of claim 1, wherein the second encoding pass:
    scales Lagrange multiplier values based on the adjusted quantization parameters; and
    changes at least some of the video coding modes associated with the video blocks based on the scaled Lagrange multiplier values.

3. The method of claim 1, wherein at least some of the video coding modes change from skipped modes to direct modes; and
    the second coding pass changes a given video block from a skipped mode video block to a direct mode video block, and generates residual information for the given video block in the direct mode.

4. The method of claim 1, wherein at least some of the video coding modes change from direct modes to skipped modes; and
    the second coding pass changes a given video block from a direct mode video block to a skipped mode video block, and eliminates residual information for the given video block in the skipped mode.

5. The method of claim 1, wherein at least some of the video coding modes change from skipped modes to inter modes; and
    the second coding pass changes a given video block from a skipped mode video block to an inter mode video block, assigns a motion vector to the inter mode video block based on a motion vector calculation for the skipped mode video block, and generates residual information for the given video block in the inter mode.

6. The method of claim 1, further comprising transmitting the video blocks encoded in the second encoding pass to another device.

7. The method of claim 6, wherein the second coding pass adjusts the quantization parameters and changes at least some of the video coding modes to collectively adjust a bit rate associated with transmitting the video blocks.

8. The method of claim 1, wherein encoding the video blocks in the second pass includes encoding 16 by 16 macroblocks of predictive (P) slices or frames and bi-directional predictive (B) slices or frames, and wherein changing at least some of the video coding modes comprises:
    changing from a skipped macroblock mode to a direct macroblock mode for at least some video blocks of B slices or frames, and
    changing from a skipped macroblock mode to an inter 16 by 16 macroblock mode for at least some video blocks of P slices or frames.

9. An apparatus comprising a video encoder that:
    encodes video blocks in a first encoding pass, wherein the first encoding pass selects one of a plurality of video coding modes for the video blocks that define motion information for the video blocks; and
    encodes the video blocks in a second encoding pass, wherein the second encoding pass adjusts one or more quantization parameters associated with the video blocks, and changes at least some of the video coding modes associated with the video blocks based on the adjusted quantization parameters, wherein the changed video coding modes affect residual information for the video blocks but do not change the motion information.

10. The apparatus of claim 9, wherein the second encoding pass:
    scales Lagrange multiplier values based on the adjusted quantization parameters; and
    changes at least some of the video coding modes associated with the video blocks based on the scaled Lagrange multiplier values.

11. The apparatus of claim 9, wherein at least some of the video coding modes change from skipped modes to direct modes; and
    the second coding pass changes a given video block from a skipped mode video block to a direct mode video block, and generates residual information for the given video block in the direct mode.

12. The apparatus of claim 9, wherein at least some of the video coding modes change from direct modes to skipped modes; and
    the second coding pass changes a given video block from a direct mode video block to a skipped mode video block, and eliminates residual information for the given video block in the skipped mode.

13. The apparatus of claim 9, wherein at least some of the video coding modes change from skipped modes to inter modes; and
    the second coding pass changes a given video block from a skipped mode video block to an inter mode video block, assigns a motion vector to the inter mode video block based on a motion vector calculation for the skipped mode video block, and generates residual information for the given video block in the inter mode.

14. The apparatus of claim 9, further comprising a modulator/transmitter that modulates and transmits the video blocks encoded in the second encoding pass to another device.

15. The apparatus of claim 14, wherein the second coding pass adjusts the quantization parameters and changes at least some of the video coding modes to collectively adjust a bit rate associated with transmitting the video blocks.

16. The apparatus of claim 9, wherein encoding the video blocks in the second pass includes encoding 16 by 16 macroblocks of predictive (P) slices or frames and bi-directional predictive (B) slices or frames, and wherein changing at least some of the video coding modes comprises:
    changing from a skipped macroblock mode to a direct macroblock mode for at least some video blocks of B slices or frames, and
    changing from a skipped macroblock mode to an inter 16 by 16 macroblock mode for at least some video blocks of P slices or frames.

17. A non-transitory computer-readable medium comprising instructions that, when executed in a processor cause the processor to:
 encode video blocks in a first encoding pass, wherein the first encoding pass selects one of a plurality of video coding modes for the video blocks that define motion information for the video blocks; and
 encode the video blocks in a second encoding pass, wherein the second encoding pass adjusts one or more quantization parameters associated with the video blocks, and changes at least some of the video coding modes associated with the video blocks based on the adjusted quantization parameters, wherein the changed video coding modes affect residual information for the video blocks but do not change the motion information.

18. The non-transitory computer-readable medium of claim 17, wherein the second encoding pass:
 scales Lagrange multiplier values based on the adjusted quantization parameters; and
 changes at least some of the video coding modes associated with the video blocks based on the scaled Lagrange multiplier values.

19. The non-transitory computer-readable medium of claim 17, wherein at least some of the video coding modes change from skipped modes to direct modes; and
 the second coding pass changes a given video block from a skipped mode video block to a direct mode video block, and generates residual information for the given video block in the direct mode.

20. The non-transitory computer-readable medium of claim 17, wherein at least some of the video coding modes change from direct modes to skipped modes; and
 the second coding pass changes a given video block from a direct mode video block to a skipped mode video block, and eliminates residual information for the given video block in the skipped mode.

21. The non-transitory computer-readable medium of claim 17, wherein at least some of the video coding modes change from skipped modes to inter modes; and
 the second coding pass changes a given video block from a skipped mode video block to an inter mode video block, assigns a motion vector to the inter mode video block based on a motion vector calculation for the skipped mode video block, and generates residual information for the given video block in the inter mode.

22. The non-transitory computer-readable medium of claim 17, further comprising instructions that cause transmission of the video blocks encoded in the second encoding pass to another device.

23. The non-transitory computer-readable medium of claim 22, wherein the second coding pass adjusts the quantization parameters and changes at least some of the video coding modes to collectively adjust a bit rate associated with transmitting the video blocks.

24. The non-transitory computer-readable medium of claim 17, wherein encoding the video blocks in the second pass includes encoding 16 by 16 macroblocks of predictive (P) slices or frames and bi-directional predictive (B) slices or frames, and wherein changing at least some of the video coding modes comprises:
 changing from a skipped macroblock mode to a direct macroblock mode for at least some video blocks of B slices or frames, and
 changing from a skipped macroblock mode to an inter 16 by 16 macroblock mode for at least some video blocks of P slices or frames.

25. A device comprising:
 means for encoding video blocks in a first encoding pass, wherein means for encoding video blocks in the first encoding pass includes means for selecting one of a plurality of video coding modes for the video blocks that define motion information for the video blocks; and
 means for encoding the video blocks in a second encoding pass, wherein means for encoding the video blocks in the second encoding pass includes means for adjusting one or more quantization parameters associated with the video blocks, and means for changing at least some of the video coding modes associated with the video blocks based on the adjusted quantization parameters, wherein the changed video coding modes affect residual information for the video blocks but do not change the motion information.

26. The device of claim 25, wherein the means for encoding the video blocks in the second encoding pass includes means for scaling Lagrange multiplier values based on the adjusted quantization parameters, and wherein the means for changing comprises means for changing at least some of the video coding modes associated with the video blocks based on the scaled Lagrange multiplier values.

27. The device of claim 25, wherein at least some of the video coding modes change from skipped modes to direct modes; and
 means for encoding the video blocks in the second encoding pass includes means for changing a given video block from a skipped mode video block to a direct mode video block, and means for generating residual information for the given video block in the direct mode.

28. The device of claim 25, wherein at least some of the video coding modes change from direct modes to skipped modes; and
 means for encoding the video blocks in the second encoding pass includes means for changing a given video block from a direct mode video block to a skipped mode video block, and means for eliminating residual information for the given video block in the skipped mode.

29. The device of claim 25, wherein at least some of the video coding modes change from skipped modes to inter modes; and
 means for encoding the video blocks in the second encoding pass includes means for changing a given video block from a skipped mode video block to an inter mode video block, means for assigning a motion vector to the inter mode video block based on a motion vector calculation for the skipped mode video block, and means for generating residual information for the given video block in the inter mode.

30. The device of claim 25, further comprising means for transmitting the video blocks encoded in the second encoding pass to another device.

31. The device of claim 30, wherein the means for encoding the video blocks in the second encoding pass includes means for adjusting the quantization parameters and means for changing at least some of the video coding modes to collectively adjust a bit rate associated with transmitting the video blocks.

32. The device of claim 25, wherein means for encoding the video blocks in the second encoding pass includes means for encoding 16 by 16 macroblocks of predictive (P) slices or frames and bi-directional predictive (B) slices or frames, and wherein means for changing at least some of the video coding modes comprises:
 means for changing from a skipped macroblock mode to a direct macroblock mode for at least some video blocks of B slices or frames, and means for changing from a skipped macroblock mode to an inter 16 by 16 macroblock mode for at least some video blocks of P slices or frames.

\* \* \* \* \*